United States Patent
Miyazaki et al.

(10) Patent No.: US 8,154,215 B2
(45) Date of Patent: Apr. 10, 2012

(54) DISCHARGE LAMP LIGHTING APPARATUS

(75) Inventors: Kengo Miyazaki, Kyoto (JP); Takafumi Toda, Takatsuki (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 198 days.

(21) Appl. No.: 12/791,106

(22) Filed: Jun. 1, 2010

(65) Prior Publication Data

US 2010/0320923 A1    Dec. 23, 2010

(30) Foreign Application Priority Data

Jun. 18, 2009  (JP) ................. 2009-145403

(51) Int. Cl.
*H05B 41/16* (2006.01)
(52) U.S. Cl. ..... 315/247; 315/307; 315/291; 315/209 R; 315/224
(58) Field of Classification Search ............ 315/247, 315/246, 224, 225, 209 R, 291, 307–316, 315/219
See application file for complete search history.

(56) References Cited

U.S. PATENT DOCUMENTS

| | | |
|---|---|---|
| 2002/0047609 A1 | 4/2002 | Weng |
| 2004/0257000 A1 | 12/2004 | Maria Langeslag |
| 2010/0102757 A1* | 4/2010 | Nakada et al. ............ 315/307 |

FOREIGN PATENT DOCUMENTS

| | | |
|---|---|---|
| JP | 4-17296 A | 1/1992 |
| JP | 11-265796 A | 9/1999 |
| JP | 3185425 B2 | 7/2001 |
| JP | 2001-338789 A | 12/2001 |
| JP | 2005-011798 A | 1/2005 |
| JP | 2005-507553 A | 3/2005 |
| JP | 2006-127793 A | 5/2006 |

OTHER PUBLICATIONS

Official Communication issued in corresponding Japanese Patent Application No. 2009-145403, mailed on Oct. 4, 2011.

* cited by examiner

*Primary Examiner* — Tuyet Thi Vo
(74) *Attorney, Agent, or Firm* — Keating & Bennett, LLP

(57) ABSTRACT

In a discharge-lamp lighting apparatus, a switching frequency of an AC voltage applied to an LC series circuit including an inductor and a capacitor is swept near a frequency having a value provided by dividing the resonant frequency of the LC series circuit by an odd number at startup of a discharge lamp and is set to a frequency near or greater than the frequency after the sweeping after the switching frequency is swept to control the on-off duty ratio of switching elements in a DC-AC inverter circuit and, after the operation at startup of the discharge lamp is repeated once or more times, the switching frequency is set to less than the frequency after the sweeping to light the discharge lamp.

5 Claims, 6 Drawing Sheets

DISCHARGE LAMP LIGHTING APPARATUS

BACKGROUND OF THE INVENTION

1. Field of the Invention

The present invention relates to a discharge-lamp lighting apparatus that lights a discharge lamp.

2. Description of the Related Art

Japanese Unexamined Patent Application Publication No. 2005-507553 discloses a discharge-lamp lighting apparatus shown in FIG. 4. The discharge-lamp lighting apparatus lights a discharge lamp by applying an alternating-current (AC) voltage and uses a full-bridge inverter circuit. In the discharge-lamp lighting apparatus in FIG. 4, the AC voltage is applied to an LC series circuit and the discharge lamp is connected to both ends of a capacitor in the LC series circuit. Upon startup of the discharge lamp, an AC voltage having a high frequency near the resonant frequency of the LC series circuit is applied to the LC series circuit to supply a high voltage necessary to start up the discharge lamp. As shown in FIG. 5, the switching frequency in the inverter circuit is swept near the resonant frequency of the LC series circuit upon startup of the discharge lamp and is set to less than the resonant frequency for a certain time period after the sweeping. After the operation at startup of the discharge lamp is repeated once or a few times, the switching frequency moves to a frequency considerably less than the resonant frequency of the LC series circuit and the discharge lamp is lighted with a lower voltage.

The switching frequency in the inverter circuit is set to less than the resonant frequency for a certain time period after the sweeping in order to warm up the discharge lamp. This is done to prevent the discharge lamp from being turned off when a higher frequency at the startup moves to a lower frequency at the lighting.

However, since the switching frequency during the application of the AC voltage for a certain time period after the sweeping is set to less than the resonant frequency of the LC series circuit, destruction of the lamp or other problems may occur if the switching frequency is matched with an acoustic resonance frequency band specific to the lamp.

SUMMARY OF THE INVENTION

To overcome the problems described above, preferred embodiments of the present invention provide a discharge-lamp lighting apparatus that increases the current flowing through a discharge lamp while avoiding an occurrence of an acoustic resonance frequency specific to the lamp to warm up the discharge lamp during application of an AC voltage for a certain time period after the switching frequency is swept upon startup of the discharge lamp.

According to a preferred embodiment of the present invention, a discharge-lamp lighting apparatus includes a direct-current voltage input terminal through which a direct-current voltage having a first value is supplied, a direct current-direct current converter circuit that converts the direct-current voltage having the first value into a direct-current voltage having a second value and that includes a switching element, an output-voltage detection circuit that detects an output voltage from the direct current-direct current converter circuit, a direct current-alternating current inverter circuit that converts the direct-current voltage output from the direct current-direct current converter circuit into an alternating-current voltage having an arbitrary frequency and that includes a switching element and an LC series circuit, a lamp-current detection circuit that detects a lamp current flowing through a discharge lamp, and a control circuit that controls turning on-off of the switching elements of the direct current-direct current converter circuit and the direct current-alternating current inverter circuit in accordance with the value of the output voltage detected by the output-voltage detection circuit and the value of the lamp current detected by the lamp-current detection circuit. The control circuit sweeps a switching frequency in the direct current-alternating current inverter circuit near a frequency having a value provided by dividing a resonant frequency of the LC series circuit by an odd number at startup of the discharge lamp and sets the switching frequency to a frequency near or greater than the frequency after the sweeping after the switching frequency is swept to control an on-off duty ratio of the switching element in the direct current-alternating current inverter circuit and, after the operation at startup of the discharge lamp is repeated once or a few times, the control circuit sets the switching frequency to less than the frequency after the sweeping to light the discharge lamp.

At startup of the discharge lamp, after the switching frequency is swept, it is preferable that the on-off duty ratio of the switching element in the direct current-alternating current inverter circuit be controlled so as to be repeated in a manner in which an ON time is longer than an OFF time during two or more periods of the switching frequency and so as to be repeated in a manner in which the OFF time is longer than the ON time during the subsequent two or more periods, and that the respective controls be alternately repeated at the same frequency.

At the startup of the discharge lamp, the switching frequency may preferably be swept from higher frequencies to lower frequencies.

At startup of the discharge lamp, the switching frequency may preferably be swept from lower frequencies to higher frequencies.

The direct current-alternating current inverter circuit is preferably a half-bridge circuit or a full-bridge circuit, for example.

According to various preferred embodiments of the present invention, the switching frequency in the direct current-alternating current inverter circuit is swept near a frequency having a value provided by dividing the resonant frequency of the LC series circuit by an odd number at startup of the discharge lamp and is set to a frequency near or higher than the frequency after the sweeping after the switching frequency is swept to control the on-off duty ratio of the switching element in the direct current-alternating current inverter circuit. Accordingly, it is possible to increase the current flowing through the discharge lamp while avoiding an occurrence of the acoustic resonance frequency specific to the lamp to prevent an occurrence of destruction of the lamp or other problems.

These and other features, elements, characteristics and advantages of the present invention will become more apparent from the following detailed description of preferred embodiments of the present invention with reference to the attached drawings.

DESCRIPTION OF THE PREFERRED EMBODIMENTS

Preferred embodiments of the present invention will be described below with reference to the attached drawings.

Figure 1:
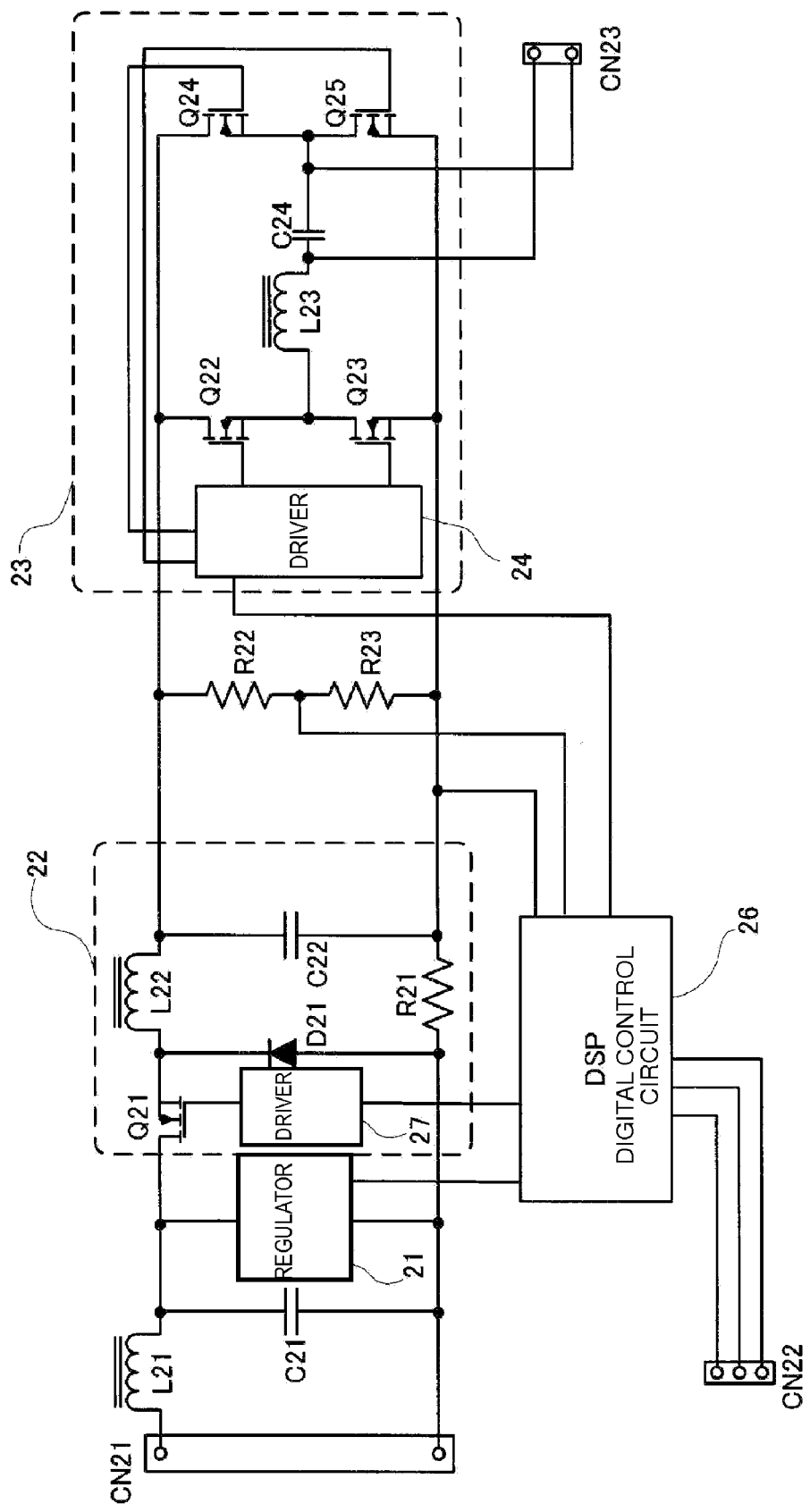
FIG. 1 is a circuit block diagram of a discharge-lamp lighting apparatus according to a preferred embodiment of the present invention.

A discharge-lamp lighting apparatus according to a preferred embodiment of the present invention lights a discharge lamp used, for example, in a front projector. FIG. 1 is a circuit block diagram of the discharge-lamp lighting apparatus of the present preferred embodiment.

Referring to FIG. 1, in the discharge-lamp lighting apparatus, a connector CN21 to which a direct-current (DC) voltage is applied is connected to a low pass filter including an inductor L21 and a capacitor C21. The low pass filter is connected to a regulator 21 that is connected to a step-down chopper circuit 22. The step-down chopper circuit 22 includes a switching element Q21, a diode D21, an inductor L22, a capacitor C22, and a resistor R21. The switching element Q21 is preferably a semiconductor switching element such as a field effect transistor (FET), for example. A digital control circuit 26 is connected to the switching element Q21 via a driver 27.

The low pass filter including the inductor L21 and the capacitor C21 stabilizes the DC voltage supplied from the connector CN21 and reduces any noise. The regulator 21 generates a power supply voltage for the digital control circuit 26 and the voltage output from the regulator 21 is used as the power supply voltage for the digital control circuit 26.

The step-down chopper circuit 22 steps down the DC voltage that is supplied to a desired voltage value. Turning on-off of the switching element Q21 is controlled by the digital control circuit 26 to produce the desired output voltage. The voltage output from the step-down chopper circuit 22 is divided by resistors R22 and R23 and the voltage components resulting from the division are supplied to the digital control circuit 26. This enables the digital control circuit 26 to monitor the voltage output from the step-down chopper circuit 22 to cause the step-down chopper circuit 22 to produce a constant output voltage.

Although the step-down chopper circuit is preferably used in the present preferred embodiment because it is assumed that a higher voltage is applied, a step-up chopper circuit may be used when a lower voltage is applied or a step-up-and-down chopper circuit may be used.

The output from the step-down chopper circuit 22 is supplied to a DC-AC inverter circuit 23. The DC-AC inverter circuit 23 includes four switching elements Q22 to Q25, an inductor L23, a capacitor C24, and a driver 24 arranged to drive the switching elements Q22 to Q25. The DC-AC inverter circuit 23 is preferably a full bridge circuit, for example. Although the full-bridge circuit is preferably used as the DC-AC inverter circuit 23 in the present preferred embodiment, a half-bridge circuit, a push-pull circuit, or other suitable circuit may be used as the DC-AC inverter circuit 23.

The driver 24 complementarily turns on the combination of the switching elements Q22 and Q25 and turns off the combination of the switching elements Q23 and Q24 or turns on the combination of the switching elements Q23 and Q24 and turns off the combination of the switching elements Q22 and Q25 in response to an instruction signal supplied from the digital control circuit 26. In accordance with the operation of the driver 24, the DC-AC inverter circuit 23 converts the DC voltage into an AC voltage and the AC voltage is applied to the LC series circuit including the inductor L23 and the capacitor C24. The AC voltage is supplied from both ends of the capacitor C24 to a discharge lamp (not shown) through a connector CN23.

A lamp current flowing through the high-voltage discharge lamp corresponding to a load is matched with the current equivalently flowing through the inductor L22 when the discharge lamp is normally lighted. Accordingly, the lamp current is detected by the resistor R21 provided in the step-down chopper circuit 22, which operates as a current detection resistor, and is monitored by the digital control circuit 26.

A connector CN22 connected to the digital control circuit 26 is used to connect the discharge-lamp lighting apparatus to a microcomputer at the device side, for example, in the front projector. The operation state of the discharge-lamp lighting apparatus, instruction signals concerning the output voltage and the output current, and other information are communicated through the connector CN22.

Figure 2:
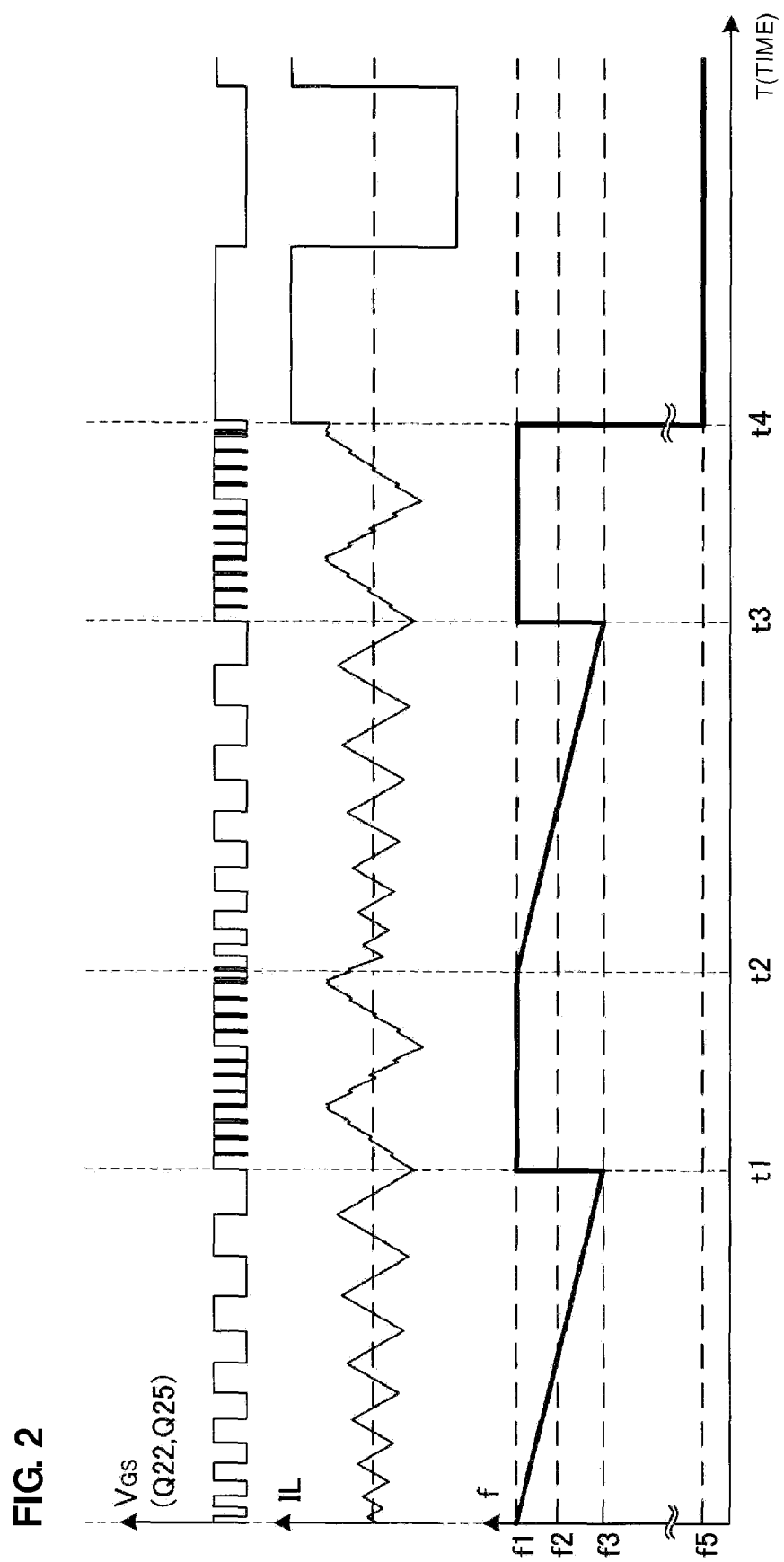
FIG. 2 illustrates a waveform diagram of a PWM pulse applied to switching elements, a waveform diagram of a lamp current flowing through a discharge lamp, and the switching frequency of the PWM pulse in the preferred embodiment in FIG. 1.

An example of the operation of the discharge-lamp lighting apparatus will now be described. In order to produce a high voltage necessary to start up the discharge lamp, upon startup of the discharge lamp, a switching frequency of the AC voltage applied to the LC series circuit including the inductor L23 and the capacitor C24 is set close to a frequency having a value provided by dividing the resonant frequency of the LC series circuit by an odd number. The switching frequency is swept near the frequency having the value resulting from the division, as shown in FIG. 2. For example, if the inductor L23 has an inductance of about 275 μH and the capacitor C24 has a capacitance of about 550 pF, the resonant frequency is equal to about 409 kHz. When the switching frequency is swept near a frequency having a value provided by dividing this resonant frequency by three, it is sufficient for the switching frequency to be swept near a frequency of about 136 kHz. Specifically, frequencies f1 and f3 in FIG. 2 at which the sweeping of the switching frequency is performed are set to, for example, about 150 kHz and about 120 kHz.

The value of the frequency near which the switching frequency is swept is not limited to a value given by dividing the resonant frequency by three, and the frequency near which the switching frequency is swept may have a value provided by dividing the resonant frequency by one, five, seven, nine, or a larger odd number, as long as the voltage necessary for starting up the discharge lamp is produced. Although the switching frequency is preferably swept from higher frequencies to lower frequencies in this example, the switching frequency may be swept from lower frequencies to the higher frequencies.

Figure 3:
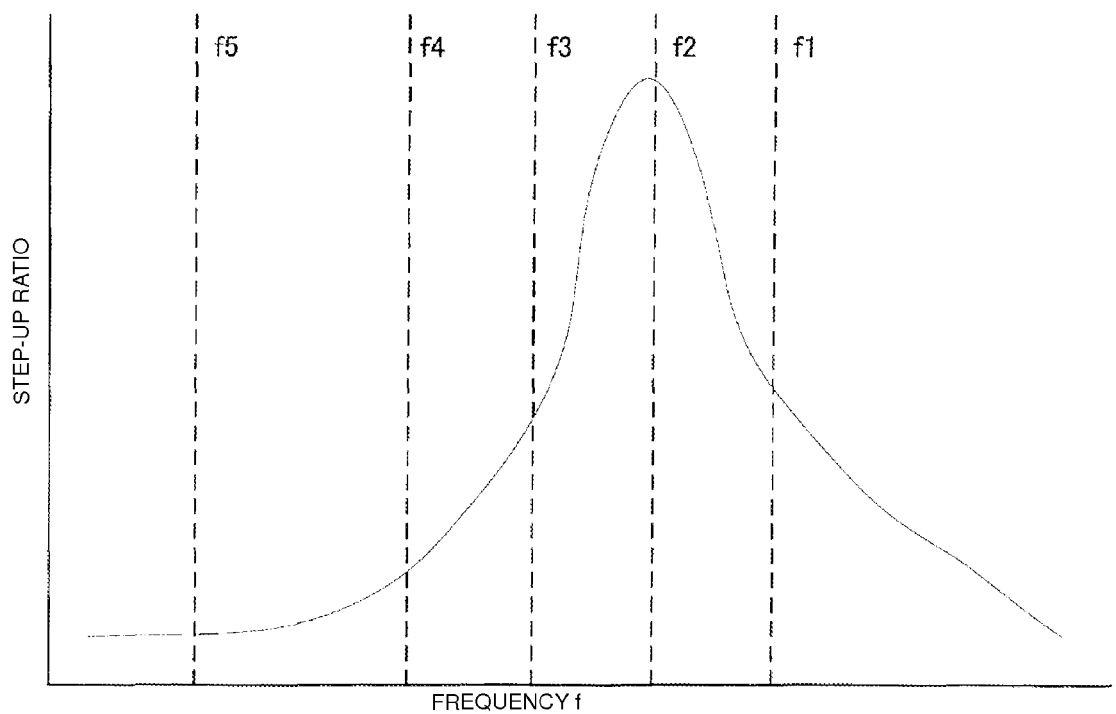
FIG. 3 illustrates an example of a frequency characteristic of a step-up ratio between the voltage supplied to an LC series circuit and the voltage at both ends of a capacitor in the preferred embodiment in FIG. 1 and in the related art.
Figure 4:
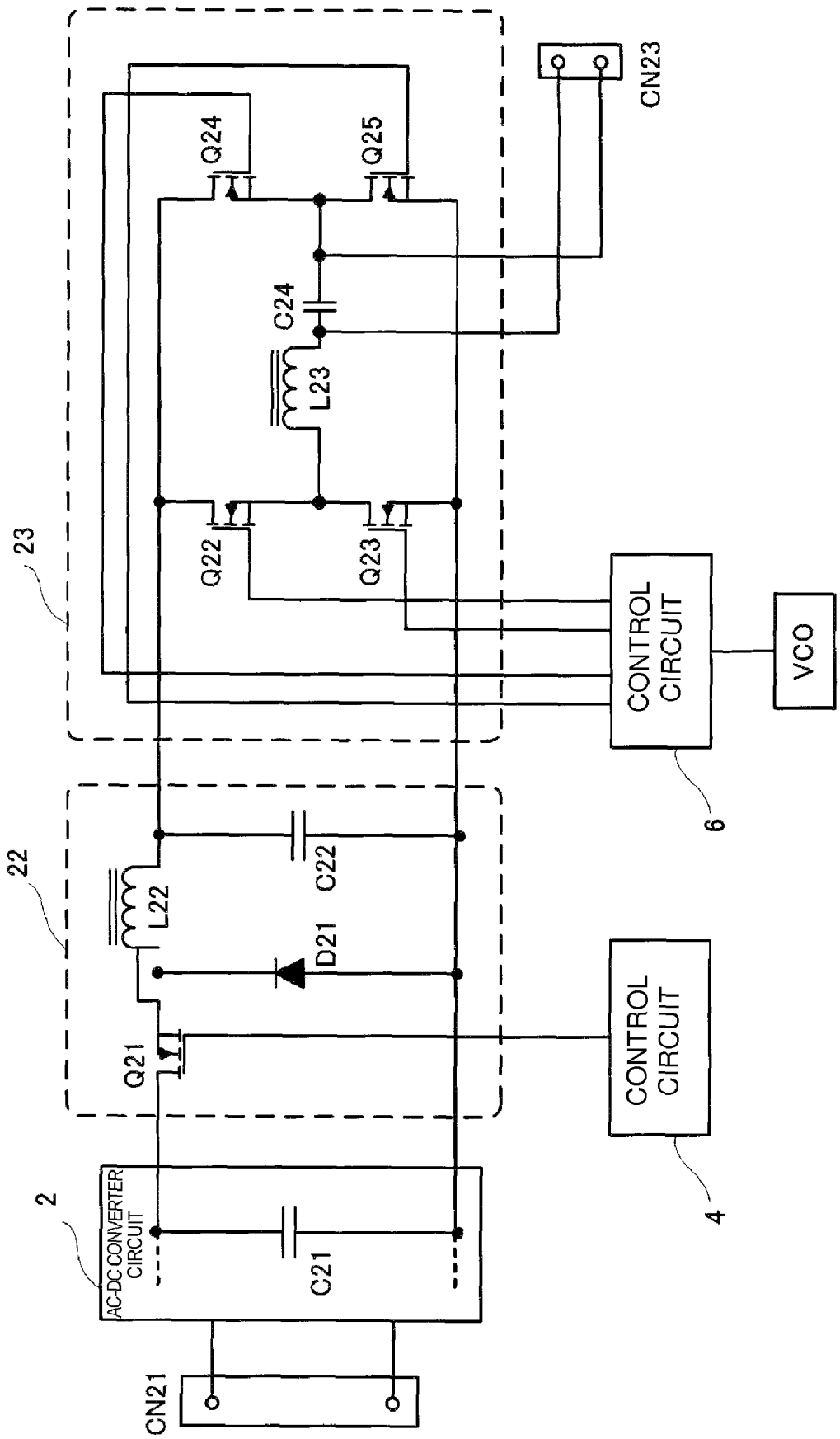
FIG. 4 is a circuit block diagram of a discharge-lamp lighting apparatus in the related art.

A high voltage necessary to start up the discharge lamp is produced at both ends of the capacitor C24 to which the discharge lamp is connected. FIG. 3 illustrates an example of a frequency characteristic of a step-up ratio between the voltage supplied to the LC series circuit and the voltage at both ends of the capacitor C24. Since the impedance of the LC series circuit is minimized at the resonant frequency, the current flowing through the LC series circuit is maximized. Accordingly, a high voltage is produced at both ends of the capacitor C24. Even when the frequency near which the switching frequency is swept has a value provided by dividing the resonant frequency by an odd number that is greater than or equal to three, a similar frequency characteristic is acquired although the peak voltage is reduced.

When a high voltage necessary for startup is applied to the discharge lamp, dielectric breakdown of the discharge lamp occurs to cause the discharge lamp to be in a glow discharge state. However, since the lamp electrodes are not sufficiently warmed up at this time, the discharge lamp may be turned off if the switching frequency is moved to a low frequency, which is used as the frequency when the discharge lamp is normally lighted.

Figure 6:
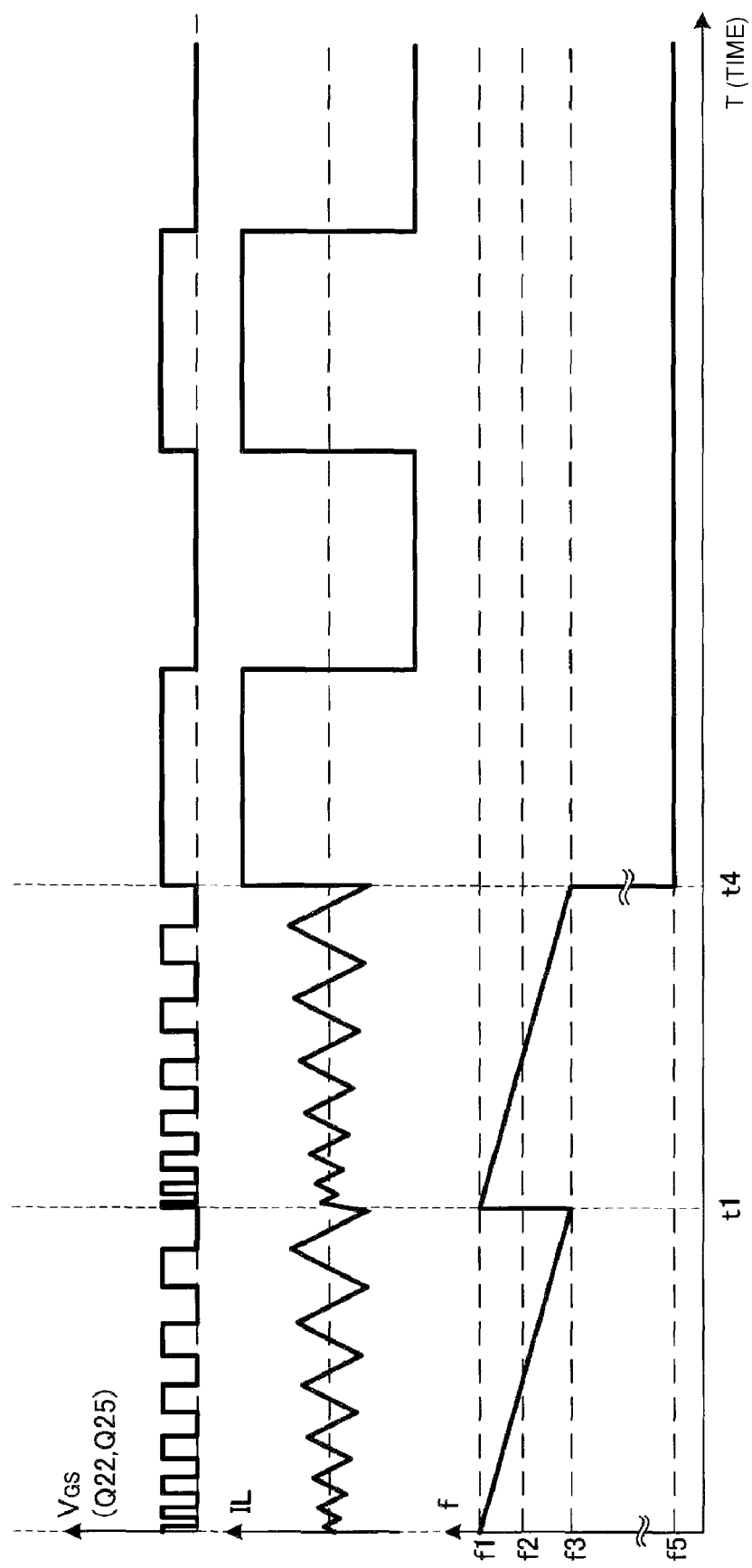
FIG. 6 illustrates a waveform diagram of a PWM pulse applied to switching elements, a waveform diagram of a lamp current flowing through a discharge lamp, and the switching frequency of the PWM pulse in another example in the related art.

In an example in the related art shown in FIG. 6, the switching frequency is swept during a period from the startup of the discharge lamp to a time t1. After similar sweeping is repeated, the switching frequency is moved to a low frequency, which is used as the frequency when the discharge lamp is normally lighted, at a time t4. In the example in the related art in FIG. 6, since only the sweeping of the switching frequency is performed at startup of the discharge lamp, a large lamp current flows for a short time period. Accordingly, the lamp electrodes may not be sufficiently warmed up. In such a case, the discharge lamp may be turned off when the switching frequency is moved to a low frequency, which is used as the frequency when the discharge lamp is normally lighted.

Figure 5:
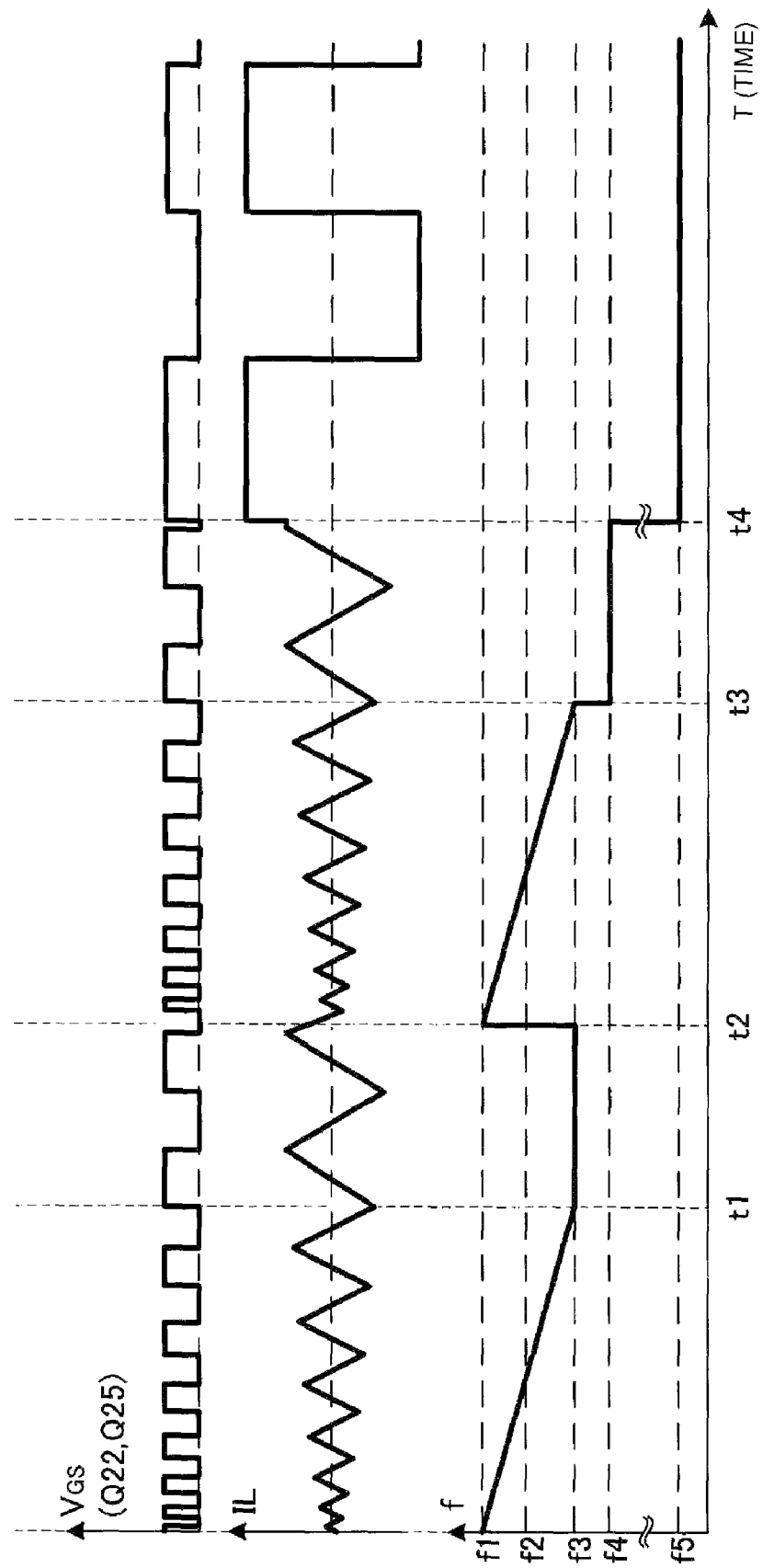
FIG. 5 illustrates a waveform diagram of a PWM pulse applied to switching elements, a waveform diagram of a lamp current flowing through a discharge lamp, and the switching frequency of the PWM pulse in an example in the related art.

In the example in the related art shown in FIG. 5, the switching frequency is swept during a period from the startup of the discharge lamp to a time t1 and the switching frequency after the sweeping is fixed during a period from the time t1 to a time t2. The switching frequency is swept again during a period from the time t2 to a time t3 and is set to less than the frequency after the sweeping during a period from the time t3 to a time t4. A lamp current IL is increased during the period from the time t3 to the time t4 to warm up the lamp electrodes in the example in the related art in FIG. 5.

However, if the switching frequency during the period from the time t3 to the time t4, which is less than the frequency after the sweeping, is matched with the acoustic resonance frequency band specific to the lamp, destruction of the lamp or other problems may undesirably occur.

Control of the on-off duty ratio of the switching elements Q22 to Q25 in the DC-AC inverter circuit 23 after the sweeping of the switching frequency, which is a characteristic of preferred embodiments of the present invention, is performed in order to increase the current flowing through the discharge lamp while avoiding an occurrence of the acoustic resonance frequency specific to the lamp after the dielectric destruction of the discharge lamp to warm up the discharge lamp. Referring to FIG. 2, a pulse width modulation (PWM) pulse $V_{GS}$ that is applied to the switching elements Q22 and Q25 during a period from a time t1 to a time t2 after the switching frequency is swept is controlled so as to be repeated at a duty ratio having a longer ON time during the first four periods and so as to be repeated at a duty ratio having a longer OFF time during the subsequent four periods. The PWM pulse $V_{GS}$ applied to the switching elements Q23 and Q24, which is not shown in FIG. 2, has logic opposite to that of the PWM pulse $V_{GS}$ applied to the switching elements Q22 and Q25 because the full-bridge circuit is used. As a result, the lamp current IL is increased in a manner shown in FIG. 2 to warm up the discharge lamp. In addition, in the control of the duty ratio, it is possible to avoid an occurrence of the acoustic resonance frequency of the discharge lamp because the switching frequency is near or greater than the frequency after the sweeping. The frequency after the sweeping is near a frequency having a value provided by dividing the resonant frequency by an odd number, for example, one, three, five, seven, or nine.

After the sweeping of the switching frequency and the control of the duty ratio for a certain time period after the sweeping, which are the operations at startup of the discharge lamp, are repeated once or a few times, the switching frequency is set to less than the frequency after the sweeping to continuously light the discharge lamp. The frequency at which the discharge lamp is continuously lighted is preferably equal to, for example, about 370 Hz and the voltage supplied to the LC series circuit is preferably applied to the discharge lamp without stepping up.

It is preferable that a digital signal processor (DSP) be used as the digital control circuit 26. Although a microcomputer, etc., may be used as the digital control circuit, the DSP is effective to increase the processing speed.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:
1. A discharge-lamp lighting apparatus comprising:
a direct-current voltage input terminal through which a direct-current voltage having a first value is supplied;
a direct current-direct current converter circuit arranged to convert the direct-current voltage having the first value into a direct-current voltage having a second value and that includes a switching element;
an output-voltage detection circuit arranged to detect an output voltage from the direct current-direct current converter circuit;
a direct current-alternating current inverter circuit arranged to convert the direct-current voltage output from the direct current-direct current converter circuit into an alternating-current voltage having an arbitrary frequency and that includes a switching element and an LC series circuit;
a lamp-current detection circuit arranged to detect a lamp current flowing through a discharge lamp; and
a control circuit arranged to control turning on-off of the switching elements of the direct current-direct current converter circuit and the direct current-alternating current inverter circuit in accordance with the value of the output voltage detected by the output-voltage detection circuit and the value of the lamp current detected by the lamp-current detection circuit; wherein
the control circuit sweeps a switching frequency in the direct current-alternating current inverter circuit near a frequency having a value provided by dividing a resonant frequency of the LC series circuit by an odd number at startup of the discharge lamp and sets the switching frequency to a frequency near or greater than the frequency after the sweeping after the switching frequency is swept to control an on-off duty ratio of the switching element in the direct current-alternating current inverter circuit and, after the operation at startup of the discharge lamp is repeated once or more times, the control circuit sets the switching frequency to less than the frequency after the sweeping to light the discharge lamp.

2. The discharge-lamp lighting apparatus according to claim 1, wherein, at startup of the discharge lamp, after the switching frequency is swept, the on-off duty ratio of the switching element in the direct current-alternating current inverter circuit is controlled so as to be repeated in a manner in which an ON time is longer than an OFF time during at least two periods of the switching frequency and so as to be repeated in a manner in which the OFF time is longer than the ON time during the subsequent at least two periods, and the respective controls are alternately repeated at the same frequency.

3. The discharge-lamp lighting apparatus according to claim 1, wherein, at startup of the discharge lamp, the switching frequency is swept from higher frequencies to lower frequencies.

4. The discharge-lamp lighting apparatus according to claim 1, wherein, at startup of the discharge lamp, the switching frequency is swept from lower frequencies to higher frequencies.

5. The discharge-lamp lighting apparatus according to claim 1, wherein the direct current-alternating current inverter circuit is a half-bridge circuit or a full-bridge circuit.

* * * * *